(12) United States Patent
Deininger et al.

(10) Patent No.: US 8,533,233 B2
(45) Date of Patent: Sep. 10, 2013

(54) GENERIC FRAMEWORK FOR PORTING LEGACY PROCESS AUTOMATION ASSETS TO A NEW CONTROL SYSTEM

(75) Inventors: Thomas Deininger, Ambler, PA (US); Michael S. Horn, Bath, PA (US); Jung Min Oh, Sellersville, PA (US); Michael Hogan, Schwenksville, PA (US); William F. Raines, Midlothian, VA (US)

(73) Assignee: Siemens Industry, Inc., Alpharetta, GA (US)

( * ) Notice: Subject to any disclaimer, the term of this patent is extended or adjusted under 35 U.S.C. 154(b) by 2184 days.

(21) Appl. No.: 10/894,624

(22) Filed: Jul. 20, 2004

(65) Prior Publication Data

US 2005/0159828 A1 Jul. 21, 2005

Related U.S. Application Data

(60) Provisional application No. 60/537,833, filed on Jan. 21, 2004.

(51) Int. Cl.
*G06F 7/00* (2006.01)
(52) U.S. Cl.
USPC ............. 707/802; 707/803; 707/809; 700/17; 700/28; 700/87
(58) Field of Classification Search
USPC .................. 717/108, 174; 709/227; 707/104, 707/204, 1, 3, 999.103, 802, 803, 809; 700/17, 700/26, 28, 87
See application file for complete search history.

(56) References Cited

U.S. PATENT DOCUMENTS

| | | | |
|---|---|---|---|
| 6,115,646 A | 9/2000 | Fiszman et al. | |
| 6,618,852 B1* | 9/2003 | van Eikeren et al. | 717/108 |
| 6,728,884 B1* | 4/2004 | Lim | 726/12 |
| 6,728,948 B1 | 4/2004 | Baxter et al. | |
| 6,810,429 B1* | 10/2004 | Walsh et al. | 709/246 |
| 6,968,346 B2* | 11/2005 | Hekmatpour | 707/104.1 |
| 6,996,589 B1* | 2/2006 | Jayaram et al. | 707/204 |
| 7,020,532 B2* | 3/2006 | Johnson et al. | 700/89 |
| 2002/0147713 A1* | 10/2002 | Smith | 707/3 |
| 2002/0174420 A1* | 11/2002 | Kumar | 717/174 |
| 2003/0050969 A1* | 3/2003 | Sant et al. | 709/203 |
| 2004/0267933 A1* | 12/2004 | Przybylski et al. | 709/227 |
| 2005/0049882 A1* | 3/2005 | Sawka | 705/1 |
| 2005/0177537 A1* | 8/2005 | Thompson | 707/1 |

\* cited by examiner

*Primary Examiner* — Hosain Alam
*Assistant Examiner* — Jieying Tang

(57) ABSTRACT

An extensible, object-oriented framework describes various generic elements of legacy automation systems. That framework is used as a basis for porting one or more of those elements to another ("target") automation system. Objects in the framework, known as "extensions," adapt information from the legacy system to a corresponding, generic representation. Compilers express those representations in the target system. The framework thus translates the "old" automation configuration for use in a "new" automation system. The scheme can be extended to accommodate arbitrary control systems (i.e., other manufacturers and product lines), new sub-domains within the automation domain (e.g. operator interfaces, batch control etc.) and new target systems without altering the core framework.

2 Claims, 6 Drawing Sheets

GENERIC FRAMEWORK FOR PORTING LEGACY PROCESS AUTOMATION ASSETS TO A NEW CONTROL SYSTEM

CLAIM OF PRIORITY

This application claims priority to, and incorporates by reference herein in its entirety, U.S. Provisional Patent Application Ser. No. 60/537,833, filed Jan. 21, 2004.

FIELD OF THE INVENTION

The present invention relates generally to the field of process automation. More specifically, the invention relates to the creation and/or translation of logic for process automation.

BACKGROUND OF THE INVENTION

Owners of process automation systems are subject to financial pressures to modernize their automation assets while minimizing the downtime involved in updating those assets. Those conflicting objectives are complicated by the fact that most legacy automation systems were designed to operate "as a whole," but various pieces (or "subsystems") of the system become obsolete at different rates. That leads to situations where the owner of an automation system may be eager to replace a 15 year-old operator console, but reluctant to replace a 15 year-old controller that the console operates.

Providers of automation control systems would happily sell a new system to customers piece by piece, but it is difficult to satisfy the replacement market at a reasonable price. Most vendors are not well positioned to swap out a "layer" in an automation system, such as an operator console, while leaving other layers, such as controllers, in place. In addition, legacy automation assets are often a hodge-podge of systems that have grown over time, so customer A may need a console replacement for system X, customer B needs a console replacement for system Y and customer C needs a console replacement that can work seamlessly with systems X and Z, while needing a new batch management system as well. In other words, upgrade scenarios are so diverse that there is no such thing as a "typical" upgrade.

A final complication is that customers tend to modernize their assets in order to obtain the integration benefits of a modern system, such as the integration of process automation data with enterprise level tools. Many of those high-level information systems were unavailable at the time that the legacy systems were conceived, and that means that there is no uniform, well-defined integration path for connecting the legacy system into a modern, enterprise-wide information system.

Despite the problems involved in automation system modernization, users do occasionally modernize pieces of their systems, although the rate of modernization is not what it could be, due to the great expense involved. Automation system upgrades are often ad-hoc replacements that require a substantial amount of engineering, a great deal of expense and a significant disruption of operations. The user often replaces more of a system than the user would like, because of the limited replacement options that most vendors provide. In some cases, vendors will create ad-hoc tools to assist in the task and in some cases there are even formal translation tools available. However, those tools are typically target-specific (e.g., a tool to integrate system X into vendor A's equipment, a tool to integrate system Y into vendor A's system and so forth). There are no known solutions available that offer a clean, uniform integration path into high-level information systems.

An object oriented framework has been used in providing interfaces in other problems involving disparate systems. For example, in U.S. Pat. No. 6,728,948 to Baxter et al., an object oriented framework mechanism is used in providing a generic order entry processing interface used in linking disparate order fulfillment systems. The interface creates and processes an order and generates requests to fill the order to one or more fulfillment systems.

There is therefore presently a need to provide a method and system for modernizing process automation assets while minimizing engineering costs and downtime. Particularly, there is a need for a technique for translating requirements of a legacy automation system to a set of parameters that may be used to configure a target automation subsystem for installation in the legacy system. To the inventors' knowledge, no such technique is currently available.

SUMMARY OF THE INVENTION

The present invention addresses the needs described above by providing an apparatus and method for determining configuration information for a target process automation subsystem to be installed in a legacy process automation system. An apparatus according to one embodiment of the invention includes at least one processor, a memory coupled to the processor, and an object oriented framework mechanism residing in the memory and executed by the processor.

The framework mechanism comprises a first interface that is extensible by a user, the first interface defining an information model to receive and store representations of generic automation sub-systems. At least one object implements the first interface. In the context of the present invention, such an object is called a "Database Automation" object or "DBA."

The framework also includes a second interface that is extensible by a user. The second interface is for interacting with an object that implements the first interface for the purpose of generating in the object that implements the first interface a representation of an automation sub-system from the legacy automation system in a form consistent with the information model. An object implementing the second interface is also called a "DBA Extension" in the present specification.

The framework further comprises a third interface that is extensible by a user. The third interface is for interacting with the object that implements the first interface, for the purpose of reading the representation of the automation sub-system from the object that implements the first interface and generating corresponding configuration information in the target automation sub-system. An object that implements the third interface is called a "DBA Compiler" herein.

The apparatus may also include a database having a schema capable of representing at least one generic subsystem. That schema is related to the information model defined by a class that implements the first interface. The schema may be extensible. The database may store sub-system entities in a persistent form.

The database may be used to determine incremental changes in configuration parameters caused by incremental changes in the legacy automation system. Those incremental changes in configuration parameters may be sent as incremental changes to the target system. The database may be implemented as one or more XML documents.

The apparatus may also include a plurality of objects implementing the second interface, the objects being for gathering information from a plurality of legacy automation systems for generating at least one representation of at least one automation sub-system entity from each of the legacy automation systems.

The apparatus may comprise a plurality of objects implementing the third interface, the objects being for expressing subsystems defined within one or more objects implementing the first interface as configuration information in a plurality of target automation systems.

At least one reusable code package may be included in the system. The code package contains commonly occurring implementation patterns in the objects implementing at least one of the first, second and third interfaces, the code packages being represented as at least one of a formal interface definition, shared binary code and shared source code.

An object implementing the second interface may further implement an interface used to assist objects implementing the third interface. That interface, called a "precompiler" herein, is suited to representing and enforcing aspects of a compilation process peculiar to a particular legacy system, thereby influencing a representation of a subsystem within the target system.

The behavior of the apparatus of the invention may be defined by a composition of at least one of the following objects: an object implementing the first interface, an object implementing the second interface, an object implementing the third interface and an object implementing the interface used to assist objects implementing the third interface. That composition may be defined by one or more external files. The external configuration files may be in XML format.

The behavior of the object defined by the first interface is defined, at least in part, by external rules contained in one or more files allowing the behavior to be altered by substituting alternative files defining a different set of behavior rules. The external files may be in XSLT format. The external files may act directly or indirectly upon an XML-based database containing incremental changes to the target system.

Another embodiment of the invention comprises a method for translating configuration information from a first automation subsystem to a second automation subsystem. The method comprising the steps of gathering configuration information from a plurality of automation subsystems, storing the configuration information from the plurality of automation subsystems as generic configuration information, and expressing the generic configuration information as configuration information in the second automation subsystem.

The method may include the step of providing an interactive user interface for controlling the gathering, storing and expressing steps, or for interactively reviewing the generic configuration information.

The method may further include the step of exporting portions of the generic configuration information to an alternative format.

The method may include the additional steps of exporting portions of the generic configuration information to an alternative information format for alteration, and importing the altered alternative information format into the generic configuration information. That exporting step may include providing a wizard to assist with exporting portions of the generic configuration information.

The method may comprise the step of exporting the generic configuration information to an alternative information format. A wizard may be provided for assisting in that exporting step as well.

The method may also include the step of importing translation information from an alternative information format. A wizard may be provided to assist with importing the altered alternative information format into the generic configuration information.

The method may include the additional steps of gathering additional configuration information independent of the plurality of automation subsystems, storing the additional configuration information in the generic configuration information, and expressing the additional automation subsystems as configuration information in the second automation subsystems.

The method may additionally comprise gathering altered configuration information from one of the automation subsystems, comparing generic configuration information from the altered configuration information to the stored generic configuration information to determine changes in the generic configuration information, and expressing the changes in the generic configuration information as changed configuration information in the plurality of second automation subsystems.

The following steps may be included in the method adding or removing one of the automation subsystems, gathering altered configuration information from the automation subsystems, comparing generic configuration information from the altered configuration information to the stored generic configuration information to determine changes in the generic configuration information and expressing the changes in the generic configuration information as changed configuration information in the plurality of second automation subsystems.

The method may comprise the step of providing an interactive graphical user interface.

The gathering and storing steps may be performed in a first version of a DBA, in which case the method further comprises the step of using DBA plug-ins for converting the generic configuration information from the first version of the DBA to generic configuration information for a second version of the DBA. The expressing step in that case is performed in the second version of the DBA.

In that case, the converting step may use rules that are based on the first automation subsystem, or may use rules that are based on the first generic configuration information from the first DBA.

The converting step may use rules embodied in a conversion plug-in that is aware of considerations specific to the first automation subsystem and/or the second version of the DBA that contained the generic automation subsystem entity configuration information. The rules of conversion may be implemented using a delegation and/or mediation pattern between a generic conversion plug-in and a specific plug-in that is related to the first automation subsystem and/or the generic configuration information contained in the first version of the DBA.

DESCRIPTION OF THE INVENTION

Figure 1:
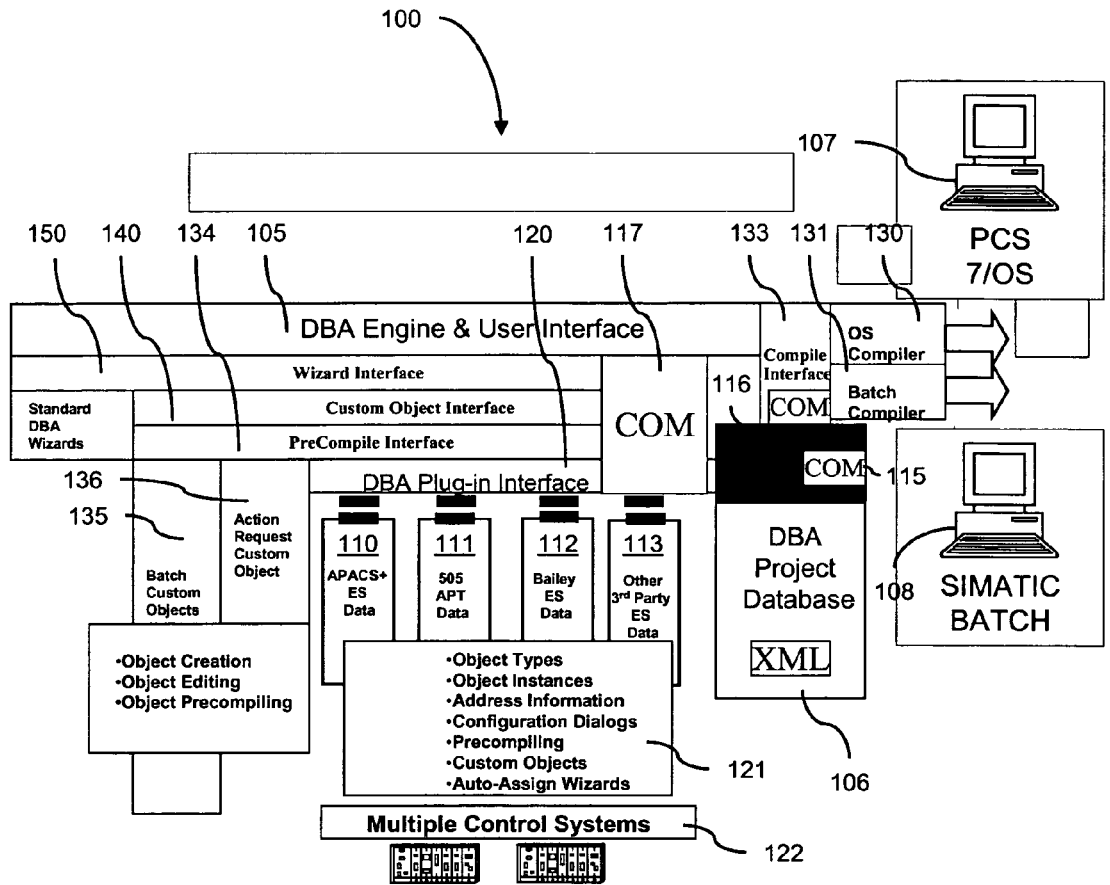
FIG. 1 is an architectural schematic diagram showing the framework of one embodiment of the invention.

The present invention is an extensible, object-oriented framework that describes various generic elements of legacy automation systems and which is used as a basis for porting one or more of those elements to another ("target") automation system.

DEFINITIONS

Many of the terms used in the present specification have been assigned more than one meaning in the terminology commonly used in the art. For that reason, the following general definitions are provided to indicate the intended meaning of those terms as used herein:

Class: A class provides an implementation of all of the methods and properties of one or more interfaces. Classes provide the code used when each function is called by a controller of the class.

Compiler: In the context of the present invention, an object that translates generic configuration information into a form that is suitable for using as configuration information for a specific system.

Declarative Language: a language that describes relationships between variables in terms of functions or inference rules and in which the language executor (interpreter or compiler) applies some fixed algorithm to these relations to produce a result. Loosely, a language that is based on rules and normally having no fixed order in which rules are applied, as opposed to an imperative language, which is implemented as a series of operations.

Delegation: A manner of implementing a program such that objects of a particular class implement methods, at least in part, by delegating execution to other objects.

Extensible: A system (e.g., program, file format, programming language, interface or class) that is designed to easily allow the addition of new features at a later date. An extensible system often uses a program hook, an API, or a plug-in.

Extend: The act of adding new features to something that is extensible.

Extension: Something that extends something else.

Fundamental Data Type: In programming, a classification identifying one of various types of data that represent a single value at a given point in time; e.g., as floating-point, integer, or Boolean. Associated with a fundamental data type is a set of the possible values for that type, the operations that can be done on that type, and the way the values of that type are stored.

Graphical User Interface (GUI): A user interface emphasizing the use of pictures for output and typically a pointing device such as a mouse for input and control.

Heterogeneous Data Sources: Data sources having semantic, syntactic, and structural differences. Heterogeneous data sources are often used in connection with the task of integrating such databases into a large, uniform data source.

Imperative Language: A computer language that works by specifying explicit sequences of steps to follow to produce a result.

Interface: A group of semantically related functions that provide access to an object. Each interface defines a contract that allows objects to interact.

Mediation: An approach to software architecture that uses plug-ins, transformation, etc. to adapt heterogeneous data sources to a common format.

Object: An instance of a class, combining both data and procedures.

Persistent Form: Also known as "persistence," a programming technique in which the state of a first object, or data being managed by a first object, may be saved and later used to initialize a second object. Normally, the purpose of persistence is to allow object-oriented applications to be terminated and then later restored to the same state that they had prior to termination. Word processors, which allow documents to be edited in a series of sessions, are good examples of applications that use persistence.

Plug-in: A class used to alter, enhance, or extend the operation of a framework.

Precompiler: In the context of the present invention, a precompiler is a class whose role is to add supplementary information to a generic configuration element before it is converted into specific configuration information for a target system.

Point: In the context of process automation systems, a point is a distinct "type" in an automation system. Generally a point has structured data members and associated behavior.

Sub-System: A system that is part of some larger system.

System: Any organized assembly of resources and procedures united and regulated by interaction or interdependence to accomplish a set of specific functions; a collection of personnel, equipment, and methods organized to accomplish a set of specific functions.

Tag: A way of requesting information for an item in a control system that is a fundamental data type.

Transformation: The act of transforming data from one format to another. Transformation is often accomplished using declarative (rule-based) languages.

User Interface: a program that controls a display for the user (usually on a computer monitor) in order to allow the user to interact with some system.

The Framework

Objects in the framework, known as "extensions," adapt information from a legacy automation system to a corresponding, generic representation. The set of available representations corresponds to common items that are found in typical automation sub-systems such as alarms, operator interface elements and control elements. The exact forms of the representations, syntactic rules, etc. governing the representations are termed "information models" herein, and are defined by a class which implements the first interface. The representations plug into the first interface, referred to herein as a Database Automation Application ("DBA"), and are used to translate specific information from a legacy system (e.g. Bailey INFI-90 control system) to generic representations that represent one or more automation sub-domains of interest.

The role of expressing representations in a target system is handled by the compilers. The DBA stores the information that is used by a compiler. In practice, the DBA also initiates the act of compilation and provides certain services that help with compilation and directs certain aspects of compilation. The compilers thus translate the "old" automation configuration for use in a "new" automation system. The scheme can be extended to accommodate arbitrary control systems (i.e., other manufacturers and product lines), new sub-domains within the automation domain (e.g. operator interfaces, batch control etc.) and new target systems without altering the core DBA application.

The inventors have proposed a framework approach to ease those problems associated with traditional automation system migration approaches. As a result, market conditions are made more favorable for users seeking to gradually upgrade their systems. By using a framework, the elements of legacy automation systems that are to be replaced are expressed in a very general format, and specific information within a given system is adapted to that format. That is possible because certain aspects of the replacement problem are truly generic, the various layers of an automation system are highly conventionalized (e.g., "operator consoles", "controllers", "I/O"), and there is a certain amount of commonality in the task of migrating elements in each layer to a specific target, independent of whether that layer is a layer in "legacy system X" or "legacy system Y." For example, mapping process information from a Siemens SIMATIC-505 PLC to a WinCC operator console is similar in many ways to mapping information from a Bailey INFI-90 system to a WinCC operator console. There is even a certain amount of universality in the problem. For example, the process of mapping information to an operator console has much in common with the process of mapping information to a batch management system.

A schematic architecture diagram of an exemplary embodiment of the invention is shown in FIG. 1. The invention comprises software 100 that is centered around a core framework, including the DBA engine and user interface 105. The "input" information, which comes from the legacy system to be replaced, is adapted to the core framework via plug-ins 110-113 that are specially designed for each type of system that is to be replaced. That allows an essentially unlimited number of legacy systems to be added to the framework database 106 without altering the core application. The core framework also allows for adaptation to various targets (e.g. operator consoles 107, batch management systems 108, etc.) via "output" plug-ins such as compilers 130, 131 that communicate through compiler interface 133 to the DBA engine 105. The output plug-ins transform information in the framework database 106 to suitable configuration information for each specific target. That allows the creation of various output formats (e.g., creation of operator console configurations, creation of batch management configurations, etc.) as business opportunities arise. The extensible nature of the input and output space allows the conversion tools to be ideally matched to market opportunities. New plug-ins may be built as needed.

The framework approach reduces validation and development costs while improving overall quality of the product. That is because the framework enforces a high degree of consistency in implementation, so validation routines and documentation are standardized. When a new "legacy system" is added to the set of importable systems, only minor changes and enhancements must be made to existing documentation and validation work in order to accommodate the new product.

The inventors have created an exemplary embodiment of the porting framework that can support the task of incrementally replacing legacy automation assets at greatly reduced cost. The framework-based approach allows the flexibility that is needed to pursue the highly fractured legacy system replacement market, and even adapt the conversion system to user-specific needs if necessary. The tools afford a uniform integration path for all user data, including pathways to enterprise-level data-systems that are one of the chief drivers for system modernization.

The term "framework," even in the context of object oriented (OO) software architecture, is subject to widely varying interpretation. As used in the present specification, the term "framework" describes an OO mechanism that has core function and extensible function. The core function of the framework mechanism is not subject to modification by the user. The extensible function, on the other hand, is designed to be changed or "extended" by the user. That definition of the term "core function," however, does not imply that a user is somehow prevented from modifying it. For example, a user could use class replacement to replace core classes in a framework. The framework design, however, contemplates that certain classes and class relationships remain undisturbed by the user, and those functions comprise the "core functions" of a framework.

Exemplary Embodiment

An exemplary embodiment of the current invention will now be described. The embodiment is herein termed "Open Database Automation" ("Open DBA") framework, and is shown schematically in FIGS. 1 and 2. The individual elements of the framework 100 will now be described.

The "DBA Project Database" 106 is a centralized database that is used to store information about process automation objects. The schema of the database 106 is "domain aware" in that it is designed to match common concepts that are used in connection with the description and design of automation systems. For example, the database preferably includes objects that correspond to "controllers," etc. In addition, the database 106 is extensible. The exemplary implementation uses eXtensible Markup Language (XML) in order to provide extensibility in the database.

The "IOpenDBA" 115 is an interface in a DBA application program interface (API) 116 that defines access methods to the DBA project database 106. The chief purpose of that interface is to abstract the DBA project database 106, so that DBA extensions interact with the database in a manner that is independent of the underlying information technology.

Another interface 117, termed "IOpenDBAExtension" in the presently described embodiment, defines methods that a DBA extension must implement. The DBA extension is actually an adapter that allows importation of information from a particular legacy system.

Legacy control system information 122 is adapted to the DBA format through the plug-ins 110-113 accessed by the framework through a plug-in interface 120. New legacy systems may be added by creating new plug-ins or by using a generic plug-in and supplying external "rules" that govern plug-in behavior. For example, most of the rules of the Bailey plug-in are driven by external extensible stylesheet language transformation (XSLT) files. That is significant because it allows for the DBA product to be easily upgraded in the field. For example, enhancements for the plug-ins may require only changes to external rule files, without any need to change the binary code. Such changes are conveniently implemented in the field without on-site programming support.

The plug-ins together with any external XSLT rules, provide a set 121 of information data to the framework, including object types, object instances, address information, configuration dialogs, precompiling, custom objects and auto-assign wizards.

In the presently described embodiment, an interface 133 called the "IDBACompile" interface allows compilers such as compilers 130, 131 for various targets to be added to the DBA framework. For example, one compiler 130 compiles information to the Siemens PCS 7/OS operator interface 107, while another compiler 131 compiles information to the Simatic batch management system 108.

The "IDBAPreCompile" interface 134 is an interface that allows DBA extensions to participate in the "compilation" process. The precompiler interface allows extensions to extend the compilation process. For example, the extensions may perform semantic checks that are specific to a particular source or sub-domain, or insert adjunct information into the compilation process.

Figure 2:
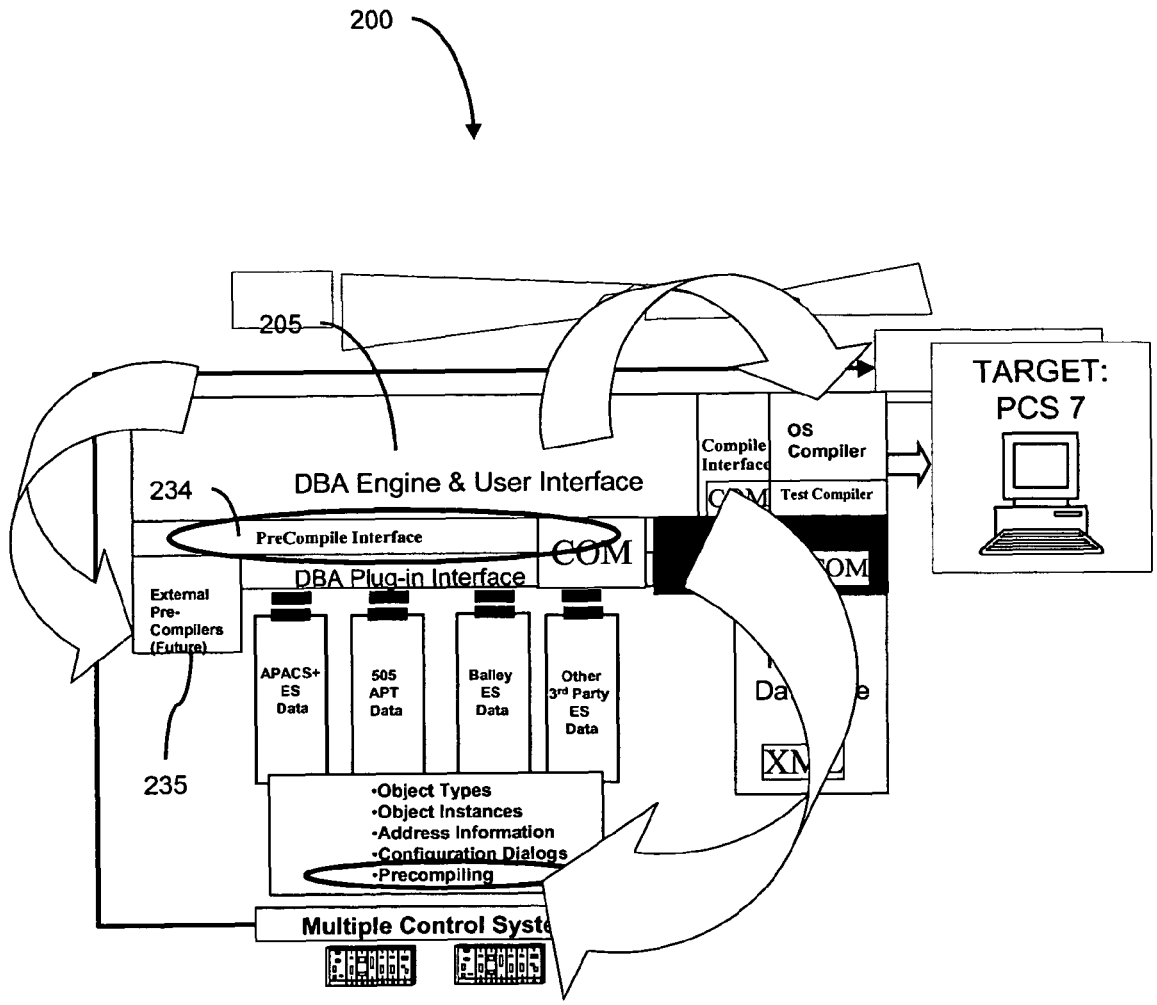
FIG. 2 is an architectural schematic diagram of the framework shown in FIG. 1, emphasizing a precompiler according to one embodiment of the invention.

The role of an exemplary IDBAPreCompile interface 234 is shown in the schematic drawings of the framework 200 shown in FIG. 2. The DBA engine 205 may obtain platform-specific adjunct information via the IDBAPreCompile interfaces 234 implemented by various extensions. It obtains generic adjunct information via external precompilers such as precompiler 235. The adjunct information is passed on to various compilers. That architecture allows enhancement of the compilation process without the need to alter any of the compilers or the core DBA application.

Returning to FIG. 1, the specifics of translating information from the DBA database 106 to any given target component 107, 108 is managed by compiler plug-ins; i.e., objects that implement the IDBACompile interface. For example, batch custom objects, as noted in discussing the DBA plug-ins 110-113, may be generic and have their behavior specified by external rule files.

In many cases, there are semantic rules that are specific to the legacy system or to the custom object being compiled. The compilers, on the other hand, are intended to be independent of the input systems. Any considerations peculiar to the legacy system that must be taken into account in the course of compiling are handled by delegating to the IDBAPreCompile interface 234 (FIG. 2) of the associated object. For example, suppose that a point (a particular subsystem of a process automation system) was imported into the DBA using a specialized object that implements IOpenDBAExtension for importing Bailey objects. When the DBA is compiling that point for the purposes of sending it to the WinCC operator system, it will ask the specialized object if it implements the IDBAPreCompiler interface. If the object does support the IDBAPreCompiler interface, then the DBA will give the specialized object the opportunity to "tweak" the point that is being compiled before it is sent on the actual WinCC compiler. That allows the specialized object to embellish the definition of the point with any additional information that is needed, abort the compile if a semantic rule was violated, etc. Advantageously, compilation is not controlled exclusively by the compilers. Instead, the actual behavior arises from an interaction between the DBA, the relevant pre-compiler and the actual target compiler.

An interface 140, termed "IDBACustomObject" in this exemplary embodiment allows the DBA to be extended for highly specific purposes. For example, a custom object may represent an Action Request, which is a specialized operator interface object that specifies and enforces very specific interactions between control system logic and human operators of a process.

Figure 3:
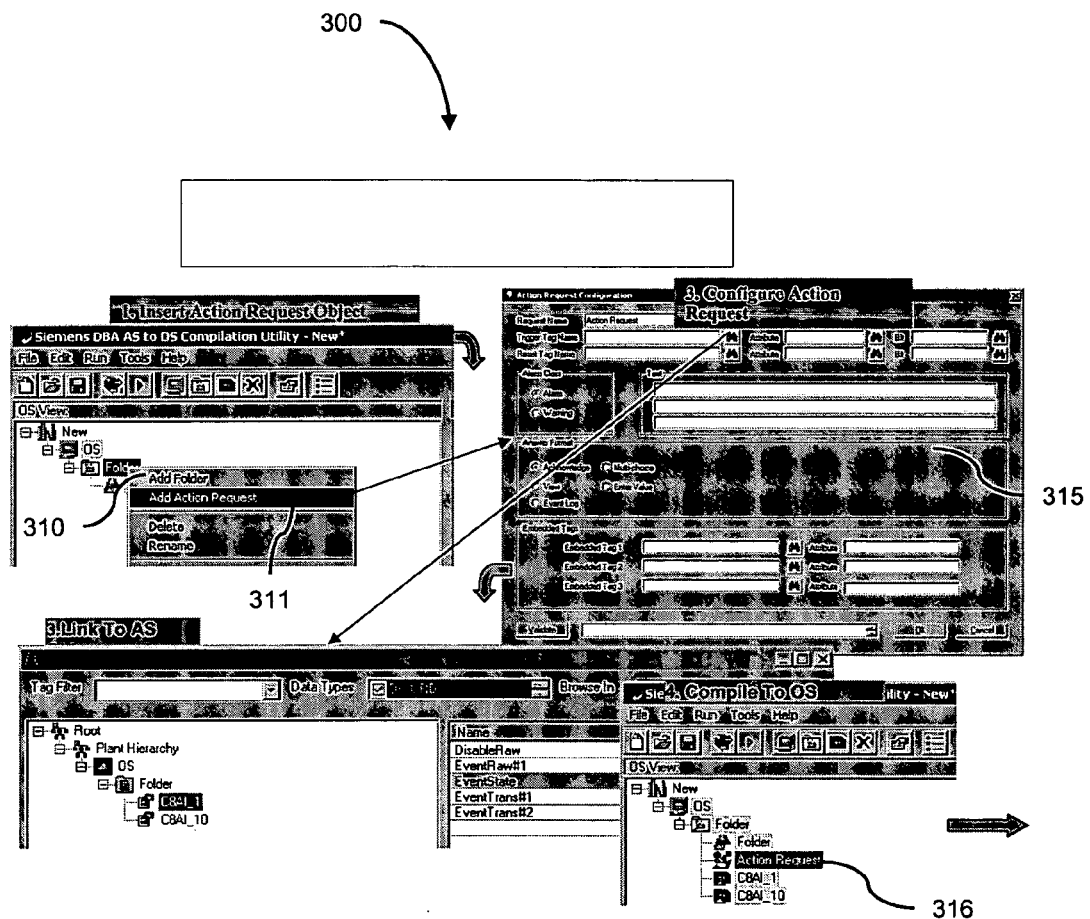
FIG. 3 is a flow diagram showing screen images of an action request workflow according to one embodiment of the invention.

Custom Object capabilities using Action Request Custom Object 136 (FIG. 1) are illustrated in the graphical representation of FIG. 3. Note that the Action Request object augments the DBA's context menu 310 by adding an "Add Action Request" choice 311 to that menu. The action request object handles the "Add Action Request" selection 311 from the context menu 310, by presenting a custom dialog 315 in response to selecting the "Add ActionRequest" context menu item. Objects are created in the DBA object hierarchy; those Action Request nodes have their own context menus, etc.

Custom objects 135, 136 (FIG. 1) may be used to capture concepts that are specific to a given legacy system, in which case they enhance the DBA extension. For example, a special, hidden custom object may be used to enforce a rule that all tags from a given OPC server must be assigned to the same Operator Console.

Custom objects may be used to capture a generic concept that is useful. For example, the Action Request discussed above is a custom object 136 that sets up configuration information used to program the operator console so that it can pop up a dialog box for an operator in response to various kinds of events that occur within the control system. There are several kinds of events that may trigger a dialog box and several kinds of dialogues that may be presented to the operator. The Action Request custom object is responsible for knowing all semantics associated with an Action Request. For example, the Action Request object must know which kinds of events can trigger an Action Request, which kinds of dialogues can be presented to an operator, which parameters must be filled in for each action request type, which parameters are optional, etc. Using those dialogues, a user can parameterize the Action Request, for example, specifying the triggering event, selecting the action request type, or specifying the prompt that a user will see. In sum, the custom object allows one to capture concepts that were not necessarily native to the legacy system or the target system.

Figure 4:
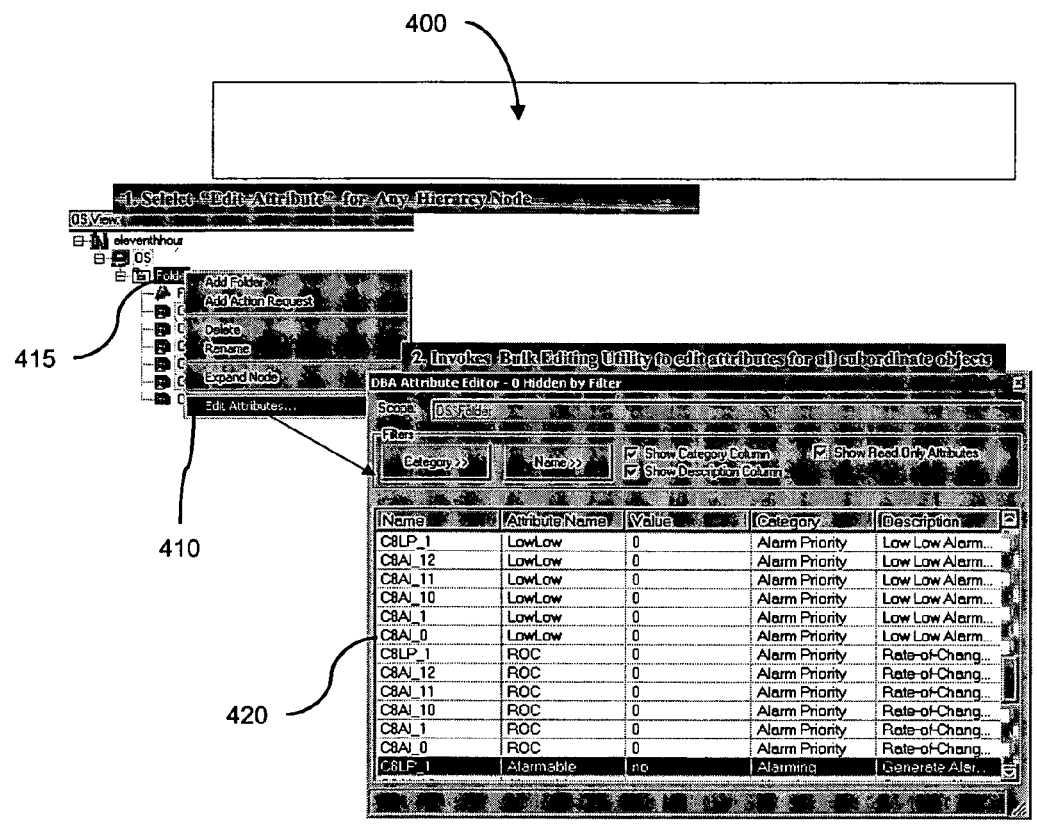
FIG. 4 is a flow diagram showing screen images of the operation of a wizard according to one embodiment of the invention.

An IDBAWizard interface 150 (FIG. 1) provides a framework for objects to automate certain tasks. Wizards may be generic. For example, in the exemplary embodiment shown in FIG. 4, a generic wizard is embodied in an "Attribute Edit" wizard, which is accessed by selecting an "edit attribute" menu item 410 in a hierarchy node 415. That wizard supports the task of bulk editing similar attributes that are owned by different objects in a DBA project database using a bulk editing utility 420.

Figure 5:
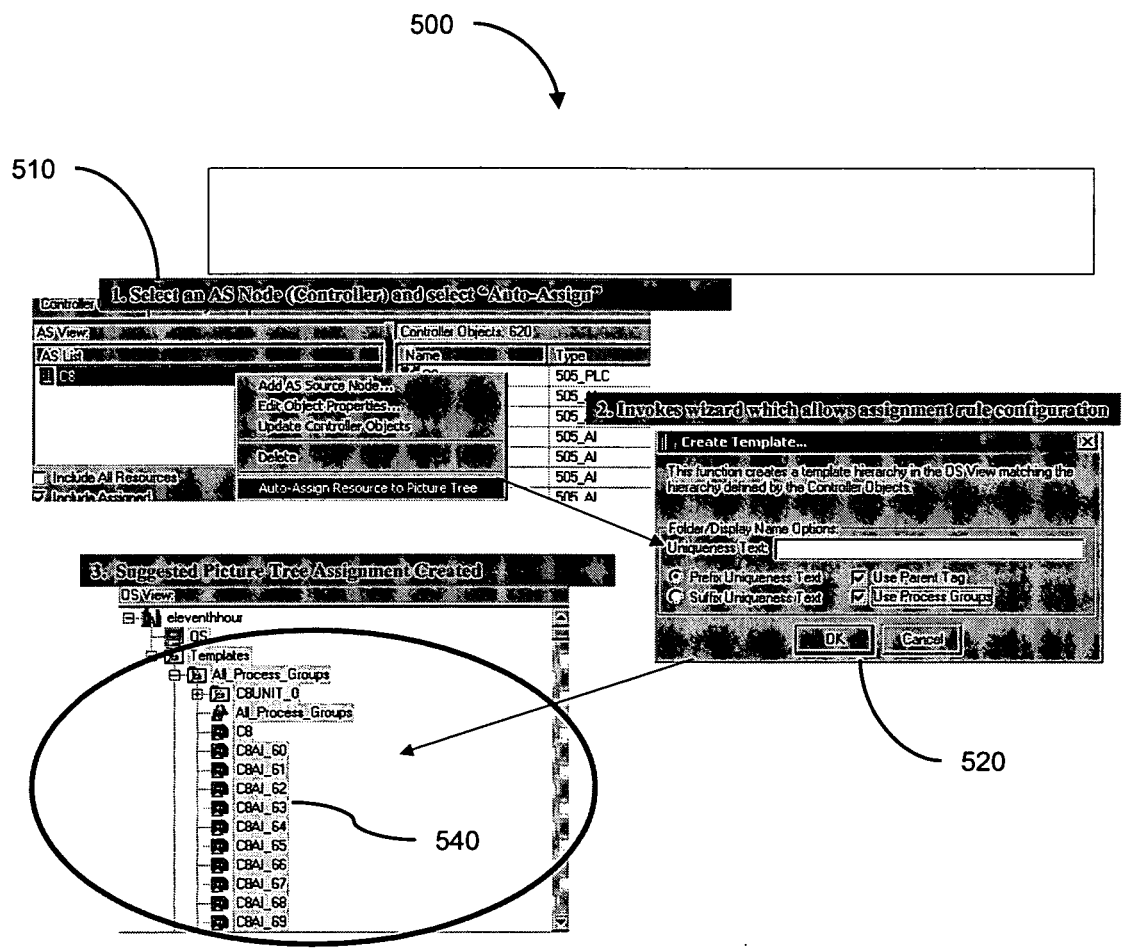
FIG. 5 is a flow diagram showing screen images of the operation of a wizard according to one embodiment of the invention.

In some cases, wizards are specific to a given legacy system. One example of such a wizard, illustrated in FIG. 5, is embodied in a "Plant Hierarchy" wizard implemented by a DBA extension. That plant hierarchy wizard uses inference rules that are particular to a given legacy system in order to arrange objects in the DBA in a hierarchy that "makes sense" for the subject system. Specifically, an AS node is selected (window 510), invoking a wizard 520 that allows assignment rule configuration. A suggested picture tree assignment 540 is then created.

Most of the plug-ins also implement an IDBAWizard interface that allows certain tasks to be performed automatically. For example, a wizard interface must assign points in the legacy system to certain positions in the operator console navigation hierarchy according to certain rules. That functionality varies from system to system, so the wizard is normally implemented by adding an IDBAWizard interface to the plug-in, such as that shown in FIG. 5.

Wizards may implement any useful helper for an operator using the DBA. For example, the Attribute Edit wizard may be used to help users classify, sort and alter attributes of entities that are being sent to the target system.

The specifics of the user interface (i.e., appearance, interaction with user and other sub-systems etc.) are largely data-driven. That allows the appearance of the GUI to be inexpensively adapted or easily extended to represent specific process automation sub-domains. For example, interfaces used to represent the creation of operator graphics differ from those used to represent batch control. In addition, the data driven rules for interaction allow the easy creation of multiple views within each domain. For example, one may wish to simultaneously see a view that represents operator consoles while also seeing a view that represents controllers whose tags are being mapped to those consoles, and to see changes made in one view reflected in the other view.

The IOpenDBA interface 115 (FIG. 1) issues events that may be captured by extensions, custom objects etc. in order to extend the user-interaction model. For example, extensions can be designed to detect contextual right-clicks and can react to those by calling appropriate IOpenDBA methods to extend context menus, react to selections on the context menu, or insert specialized dialogues into the application examples.

Figure 6A:
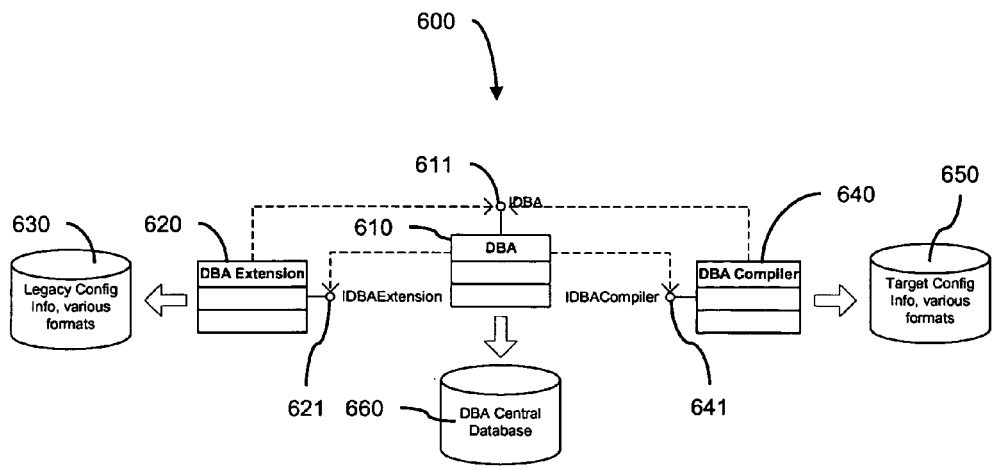
FIG. 6 is a schematic block diagram showing an apparatus according to one embodiment of the invention.
Figure 6B:
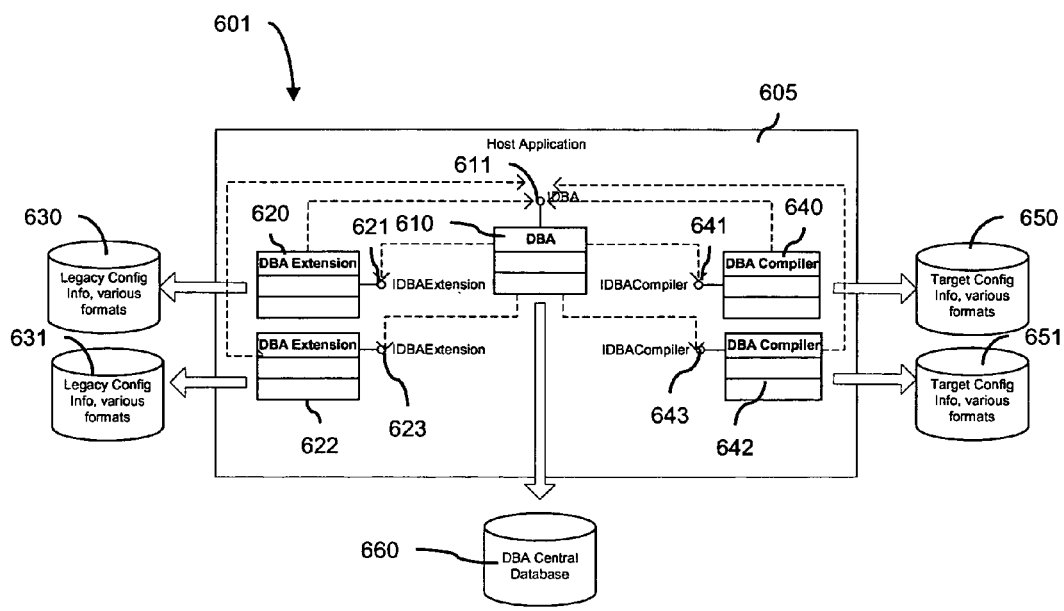

FIGS. 6a and 6b illustrate object-oriented structures of the framework of the invention. In the embodiment shown in FIG. 6a, a framework 600 includes a DBA object which implements the IDBA interface 611. The class 610 implements the methods, properties and events that are defined by the interface 611. These methods, properties and events are suited to defining an information and interaction model that gathers and stores representations of generic automation subsystem entities. The interface 622 is implemented in this example by a concrete object 610.

A second class 620, termed "DBA Extension," is an extension created by a user and implements the IDBAExtension interface 621. The "IDBAExtension" interface defines methods, properties and events suited to interacting with objects that implement the IDBA interface, for the purpose of representing an automation subsystem entity in the legacy system within the DBA. Configuration information, in various formats, etc. from the legacy system 630 are gathered by the DBA Extension 620 and converted into representations that are stored in the DBA.

A third interface class 641, termed "IDBACompiler," is extensible by the user and defines an interface that is implemented by classes such as 640 "DBA Compiler". The IDBACompiler interface defines methods, properties and events suited to interacting with an object which implements the IDBA interface, for the purpose of expressing information contained in the DBA as configuration information in a target automation subsystem entity.

In a preferred embodiment, a DBA central database 660 is accessible to objects such as object 610 which implements the IDBA interface 611. The database 660 has a schema that is capable of representing at least one generic entity of the automation system. For example, the entity may be a "point" representing the structured data associated with a control element in the legacy system whose data is to be visualized by an operator interface. The database schema is related to the methods and properties of the first interface 611.

The structure 601 shown in FIG. 6b is an expanded architecture of the framework 600 of FIG. 6a. For clarity, like elements of the framework 601 of FIG. 6b are numbered identically to the elements of the framework 600 of FIG. 6a.

The framework 601 includes a host application 605 functioning as a container application hosting the objects that are instances of classes 610, 620, 622, 640, 642. The host application 605 provides useful services to the components in the composed system. Those services may include GUI elements, networking elements or an element configuration service.

Additional legacy system data 631 and corresponding DBA extension 622 implementing the IDBAExtension interface 623 may be added to the system, permitting the use of the framework with more than one legacy system. Further, additional target configuration information 651 and corresponding DBA compiler 642 implementing IDBACompiler interface 643 may be added to permit the creation of additional target configuration files.

The foregoing Detailed Description is to be understood as being in every respect illustrative and exemplary, but not restrictive, and the scope of the invention disclosed herein is not to be determined from the Description of the Invention, but rather from the claims as interpreted according to the full breadth permitted by the patent laws. For example, while the technique is described primarily for use in connection with manufacturing process automation systems, the technique of the invention may be used in replacing components in any system having mutually dependent and interacting components, such as an inventory control/retail sales system, while remaining within the scope of the invention. It is to be understood that the embodiments shown and described herein are only illustrative of the principles of the present invention and that various modifications may be implemented by those skilled in the art without departing from the scope and spirit of the invention.

What is claimed is:

1. A method for translating configuration information from a first automation subsystem of a legacy process automation system to a second automation subsystem and replacing the first automation subsystem, the method comprising the steps of:

gathering configuration information from a plurality of automation subsystems of the legacy process automation system;

storing the configuration information from the plurality of automation subsystems as generic configuration information;

translating the configuration information from the first automation subsystem of the legacy process automation system to the second automation subsystem by expressing the generic configuration information from the plurality of automation subsystems as configuration information in the second automation subsystem; and replacing the first automation subsystem of the legacy process automation system with the second automation subsystem, wherein:

the gathering and storing steps are performed in a first version of a DBA; and the method further comprises the step of using DBA plug-ins for converting the generic configuration-information from the first version of the DBA to generic configuration information for a second version of the DBA; and the translating step is performed in the second version of the DBA;

wherein the converting step uses rules that are based on the first automation subsystem.

2. A method for translating configuration information from a first automation subsystem of a legacy process automation system to a second automation subsystem and replacing the first automation subsystem, the method comprising the steps of:

gathering configuration information from a plurality of automation subsystems of the legacy process automation system;

storing the configuration information from the plurality of automation subsystems as generic configuration information;

translating the configuration information from the first automation subsystem of the legacy process automation system to the second automation subsystem by expressing the generic configuration information from the plurality of automation subsystems as configuration information in the second automation subsystem; and replacing the first automation subsystem of the legacy process automation system with the second automation subsystem, wherein:

the gathering and storing steps are performed in a first version of a DBA; and the method further comprises the step of using DBA plug-ins for converting the generic configuration-information from the first version of the DBA to generic configuration information for a second version of the DBA; and the translating step is performed in the second version of the DBA;

wherein the converting step uses rules that are based on the generic configuration information from the first version of the DBA.

* * * * *